United States Patent
Myers et al.

(10) Patent No.: US 9,885,323 B1
(45) Date of Patent: Feb. 6, 2018

(54) COMPACT EJECTOR SYSTEM FOR A BOOSTED INTERNAL COMBUSTION ENGINE

(71) Applicant: Ford Global Technologies, LLC, Dearborn, MI (US)

(72) Inventors: Chris A. Myers, Holly, MI (US); Dhaval P. Vaishnav, Canton, MI (US); Syed K. Ali, Dearborn, MI (US); David S. Moyer, Sterling Heights, MI (US); Scott M. Rollins, Canton, MI (US); Matthew Werner, Marysville, MI (US); Eric A Macke, Ann Arbor, MI (US); Roger Joseph Khami, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/225,920

(22) Filed: Aug. 2, 2016

(51) Int. Cl.
*F02M 25/08* (2006.01)
*F02M 35/10* (2006.01)

(52) U.S. Cl.
CPC ...... *F02M 25/0872* (2013.01); *F02M 25/089* (2013.01); *F02M 35/10222* (2013.01); *F02M 2200/8046* (2013.01)

(58) Field of Classification Search
CPC ........... F02M 13/022; F02M 2013/026; F02M 2013/007; F02M 25/0872; F02M 25/089; F02M 35/10222; F02M 35/10157; F02M 2200/8046
USPC .............................. 123/516, 518–520, 198 D
See application file for complete search history.

(56) References Cited

U.S. PATENT DOCUMENTS

| | | | |
|---|---|---|---|
| 5,005,550 A | 4/1991 | Bugin, Jr. et al. | |
| 9,133,796 B2 | 9/2015 | Plymale et al. | |
| 9,726,067 B2 * | 8/2017 | Hakeem | F01P 7/10 |
| 2011/0138774 A1 | 6/2011 | Pursifull | |
| 2013/0008413 A1 | 1/2013 | Inoguchi | |
| 2013/0263590 A1 * | 10/2013 | Kempf | F02M 25/0836 60/605.1 |
| 2014/0144139 A1 * | 5/2014 | Alecu | F02C 7/14 60/728 |
| 2014/0196694 A1 * | 7/2014 | Euliss | F02M 25/08 123/520 |
| 2014/0251284 A1 * | 9/2014 | Plymale | F02M 25/089 123/518 |
| 2015/0096541 A1 | 4/2015 | Edmund | |

(Continued)

FOREIGN PATENT DOCUMENTS

JP       2014-240621 A    12/2014

*Primary Examiner* — John Kwon
*Assistant Examiner* — Johnny H Hoang
(74) *Attorney, Agent, or Firm* — Gregory P. Brown; Diana D. Brehob; Brehob Law, PLLC

(57) ABSTRACT

Vapors in the fuel tank of a vehicle are collected in a carbon canister. An ejector or aspirator is used to purge the carbon canister in a pressure-charged engine in which a positive pressure exists in the intake. A compact ejector includes a substantially planar flange and a venturi tube coupled to the flange with a central axis of the venturi tube substantially parallel to the flange. By mounting the ejector on an intake component, having the venturi tube on the inside of the intake component, and having the venturi tube parallel to the flange yields a very compact package and protects the ejector from damage from other engine components.

22 Claims, 10 Drawing Sheets

(56) References Cited

U.S. PATENT DOCUMENTS

| | | | |
|---|---|---|---|
| 2015/0114348 A1* | 4/2015 | Pursifull | F02M 35/10229 123/403 |
| 2015/0159601 A1* | 6/2015 | Luehrsen | F02M 35/10118 123/564 |
| 2015/0204283 A1* | 7/2015 | VanDerWege | F02M 35/10144 123/445 |
| 2015/0369184 A1 | 12/2015 | Bucknell | |

* cited by examiner

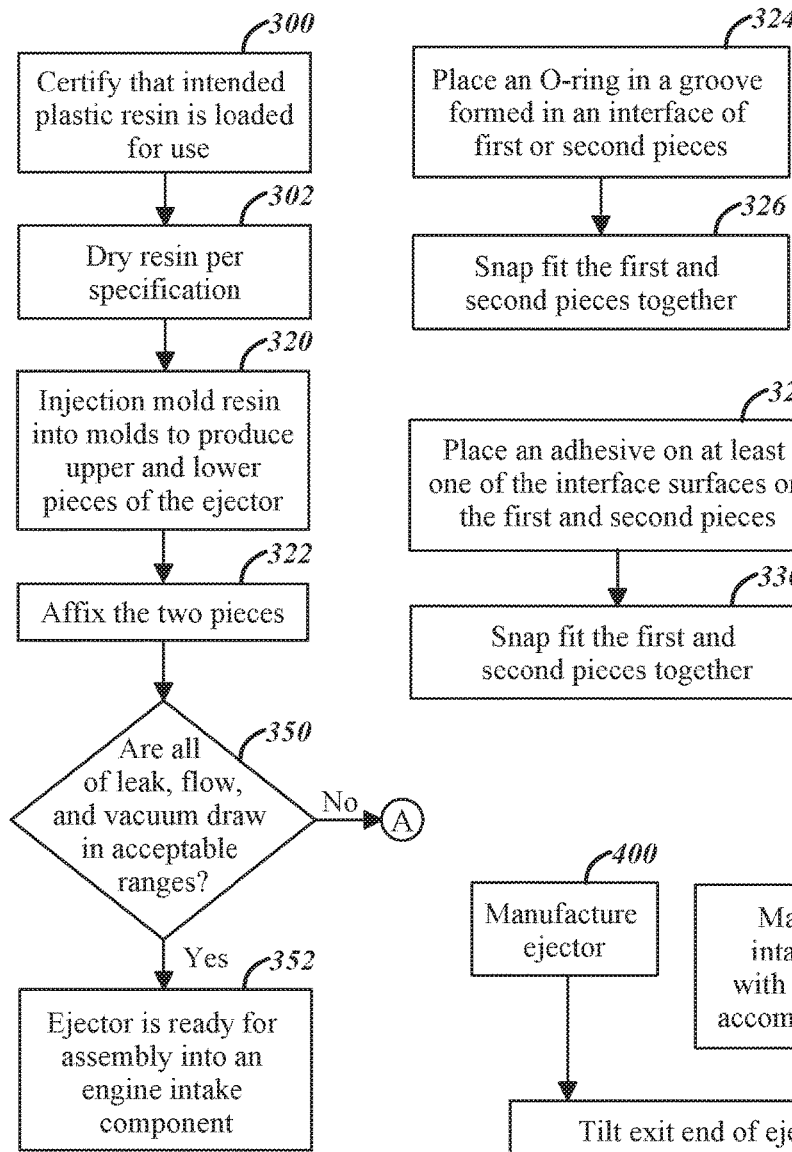
*FIG. 13*
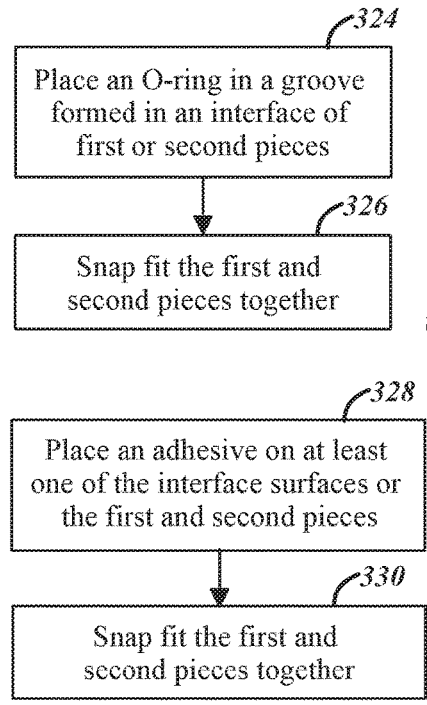
*FIG. 14*
*FIG. 15*
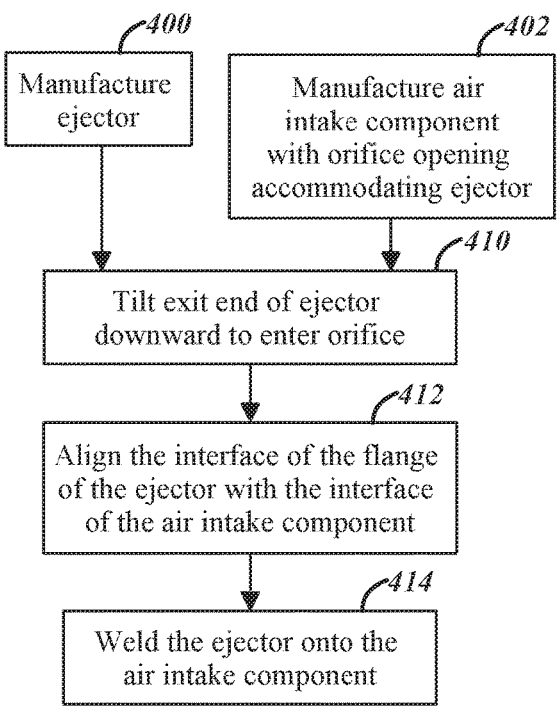
*FIG. 16*

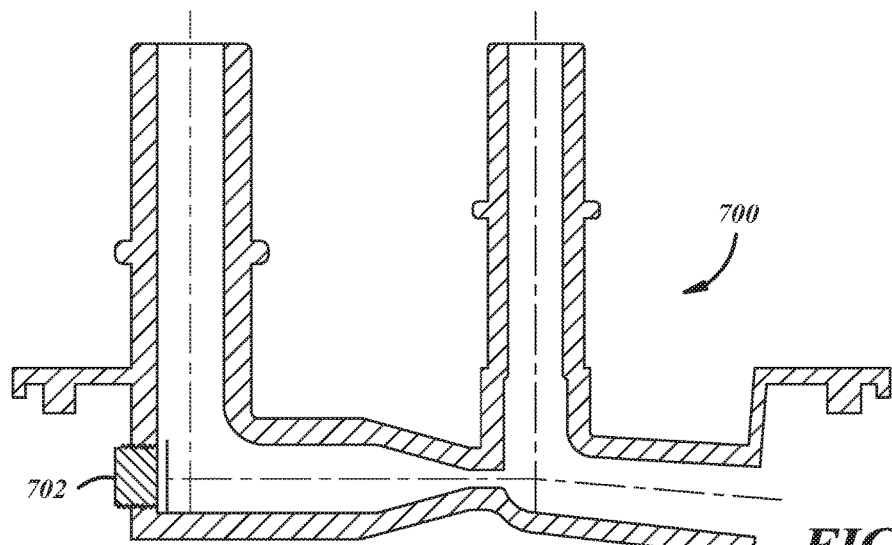
FIG. 21
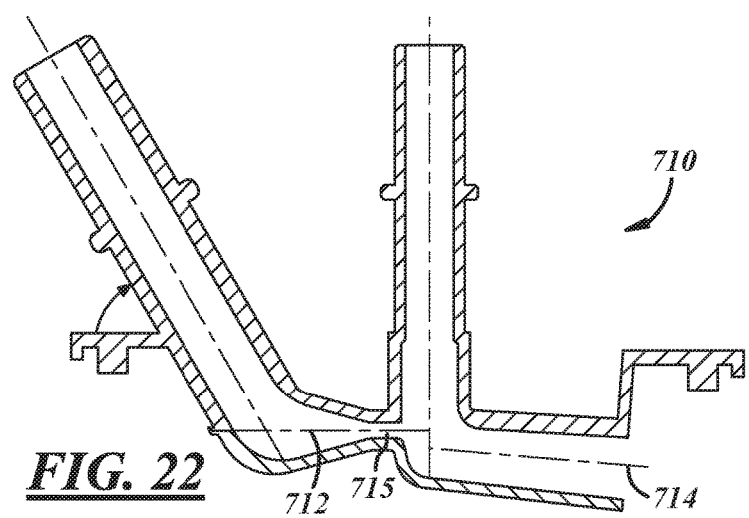
FIG. 22
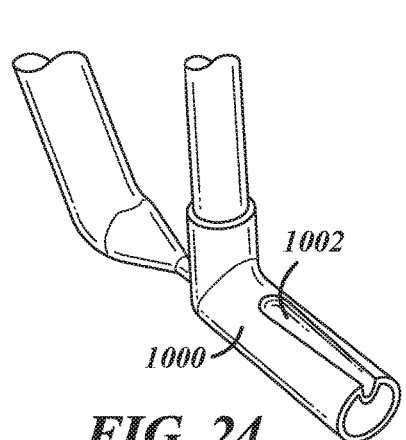
FIG. 24
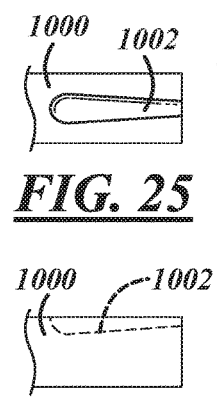
FIG. 25
FIG. 26
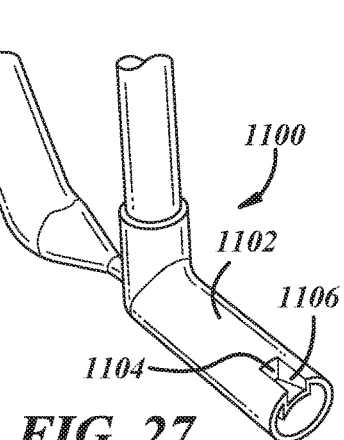
FIG. 27

COMPACT EJECTOR SYSTEM FOR A BOOSTED INTERNAL COMBUSTION ENGINE

FIELD OF INVENTION

The present disclosure relates to a vapor purge system for an internal combustion engine, particularly related to an ejector for aiding purge during boosted operation.

BACKGROUND

Vehicles are equipped with an evaporative emission control system that traps fuel vapors from the fuel tank of the vehicle and stores them in a canister in which charcoal particles or other suitable media are disposed. The fuel vapors are absorbed onto the charcoal particles. To avoid overloading the canister such that the charcoal particles have no further capacity to absorb fuel vapors, the canister is purged regularly.

In a naturally-aspirated internal combustion engine, the pressure in the intake manifold is depressed. This vacuum is used to draw fresh air through the canister. The vapor-laden air is then inducted into the engine and combusted. A purge valve or port is provided that fluidly couples the canister with the intake of the engine when purging is desired.

In boosted engines, i.e., turbocharged, supercharged, or boosted by any suitable device, pressure in the engine's intake is often above atmospheric thereby reducing the available times for purging. To obtain a vacuum to drive purge flow, a tube with a throat (reduced diameter section) causes a higher flowrate which causes the vacuum. The component in which the throat is included is called an ejector or an aspirator.

An example of a prior art configuration in FIG. 1. An engine 10 has an air intake system including a manifold 12 and a throttle body 14. Throttle body 14 has an air passage 16 and a throttle valve 18 to control the quantity of air flowing into manifold 12. Throttle body 14 has an inlet 20 fluidly connected to an outlet 22 of a turbocharger assembly 24.

Turbocharger assembly 24 includes a compressor 26 and a turbine 28. Compressor 26 and turbine 28 are both mounted upon a common shaft 30. Exhaust gases are directed through a duct 32 to turbine 28 and discharged through an outlet tube 34.

Compressor 26 receives air from an inlet duct 36. Air is pressurized by compressor 26 and discharged into outlet 22 and then into throttle body 14 or charge air cooler into manifold 12 and then into engine 10.

Modern engines are equipped with vapor emission control systems which include a fuel vapor storage canister 38. Vapor storage canister 38 has a quantity of activated charcoal particles 40 or other suitable adsorbent material. Activated charcoal absorbs fuel vapor and stores them. Charcoal particles 40 are secured between a lower screen 42 and an upper screen 44. Fuel vapors and air are routed to the interior of canister 38.

Charcoal 40 has a finite storage capacity of fuel vapor. Therefore, the canister is purged periodically to remove fuel vapor from the charcoal by drawing air from the atmosphere into the canister and through the activated charcoal bed. Atmospheric air flows through picks up molecules of fuel vapor in an adsorption process. The fuel laden air is drawing into combustion chambers of engine 10 and burned. An air inlet 46 is provided to allow purge air to engine canister 38. Air from inlet 46 passes downward through a duct 48 to a space 50 beneath the screen 42 and above the bottom of canister 38.

Canister 38 has an outlet opening 52 to allow purge air and fuel vapors to be discharged from canister 38. Normally, purge air and fuel vapor is desorbed from the charcoal through a conduit 54 to either of conduits 56 or 58; alternatively, the conduit can be coupled to the intake manifold. When engine 10 is idling, throttle valve 18 assumes a position 18' and the interior of throttle body 14 downstream of throttle valve 18 is at a vacuum. During this period, purge air is drawn from conduit 56 through an orifice 60. Excessive purge can interfere with engine performance. A fuel vapor management valve 62 controls air-fuel vapor purge based on engine operating conditions into intake manifold 12.

When engine 10 is operating at part throttle, i.e. with throttle valve 18 between the idle position and wide open throttle (position shown as element 18 in FIG. 1). The portion of throttle body 14 upstream of throttle valve 18 is exposed to manifold vacuum pressure. This vacuum includes air flow through conduit 58, check valve 64, an orifice 66, and port 68 into throttle body 14. Purge flow is influenced by the relative position of throttle valve 18 to port 68 and by the size of the orifice. Orifice 66 limits the purge air flow into engine 10 as appropriate for good operation.

When engine 10 is operating under boost conditions, compressor 26 generates a greater pressure at outlet 22 of turbocharger 24 than at inlet 36. Under these conditions, compressor 26 generates a positive pressure in throttle body 14 and in manifold 12. Check valves 62, 64 prevent air flow from throttle body 14. The positive pressure at outlet 22 causes air to flow through a conduit 70 to an inlet end portion 72 of an ejector 74. Ejector 74 includes a housing defining inlet end portion 72, outlet end portion 66 and a reduced dimension passage 78 (throat) there between. Air passes from inlet 72 through throat 78 to an outlet 76 and then through conduit 80 to inlet 36 of compressor 26. Flow of air through throat 78 reduces pressure as is well known by one skilled in the art.

Ejector 74 also includes a purge air passage 82 which opens into passage 78. Conduit 54 is connected to the purge air passage of ejector 74. A check valve 84 allows the flow of air and vapors from conduit 54 into passage 82 and then into passage 78. Finally, purge air and vapor pass through conduit 70 into throttle body 14 and then into engine 10. During non-boost operation of engine 10, check valve 84 prevents air flow from ejector 74 back to canister 38.

The above-described emissions control operates effectively to route purged vapors to engine 10 and treatment by a catalytic converter (not shown). However, under some conditions, it is undesirable to purge canister 38. For example, when the catalytic converter is too cool to effectively process exhaust gases, provision is made to prevent canister purging. A control valve 86 is provided downstream of outlet opening 52 from canister 38. Valve 86 has an outlet port 88 formed by a valve seat 90. A movable valving member such as a diaphragm 92 is normally positioned by a spring 94 against seat 90 so that air cannot flow through valve 86. This is the condition of the valve when no purge is desired as mentioned above.

When air flow through valve 86 is desired, a vacuum pressure is introduced into valve 86 above the diaphragm 92 which unblocks port 88. Vacuum is directed to valve 86 through a conduit 96 which is connected to a port of a solenoid controlled on-off valve 98. Another port of valve 108 is connected to a conduit 100. In turn, the conduit is connected to a conduit 104. An electric solenoid valve 108 is connected to a conduit 100. In turn, conduit 100 is connected to check valve 102 which is connected to a conduit 104. When open, vacuum is communicated to the space above diaphragm 92 thus allowing purging. When closed, no vacuum is routed to the space above diaphragm 92 thus allowing purging. When closed, no vacuum is routed to the space above the diaphragm and port 88 is blocked thus preventing purging of canister 38. Solenoid valve 108 is commanded to energize by an engine electronic control unit 110 (ECU).

The componentry shown in FIG. 1 is provided merely as background to the present disclosure and is not intended to be limiting in any way. The components are known to be coupled in alternative ways to that shown in FIG. 1.

Ejector 74 of FIG. 1 suffers from multiple deficiencies. It is a stand-alone part that must be separately packaged, protected from damage, and supported. It is known to mount an ejector on an engine intake component, such as shown in FIG. 4. Referring first to FIG. 2, an ejector 120 is shown that has a flange 122 through which tubes 124 and 126 extend. Ejector 120 is shown in cross section in FIG. 3. Disposed in tube 124 is an insert 130 with a reduced cross section. Insert 130 has a throat 132 with a small cross section. The speed at which gases move through throat 132 is much greater than the speed of the flow at an inlet of tube 124. Downstream of insert 130 is a straight section 136. It would be preferable to have this be a diverging tube. Prior art manufacturing methods led to tube 136 being straight. Tube 134 couples to tube 124 at the location of throat 132 via a tee tube 134 to thereby induce flow through 126. In the fabrication of ejector 120, the inside diameter of tube 134 is formed through an orifice proximate a plug 128. After fabrication, tee tube 134 is sealed via plug 128. Ejector 120 is shown mounted to an air box 150 in FIG. 4.

The ejector system shown in FIG. 4 presents some deficiencies. Referring to FIG. 4, the depth that the ejector extends into air box 150 is shown by numeral 140 and the width of ejector 120 within air box 150 is shown by numeral 142 in FIG. 3. This presents considerable encroachment on the interior of air box 150. Air boxes have unique designs depending on the engine, the vehicle, and other package considerations such as other accessories. Although it would be desirable for a vehicle manufacturer to have three or four standard air boxes, in reality, there is little crossover among different vehicles. It is likely that many unique ejectors would be required to mate to a variety of air boxes. The considerable encroachment can also cause higher flow restriction for the air passing through the duct. The ejector of FIGS. 2-4 has three elements: the main body of ejector 120, a cap 144, and insert 130. Insert 130 is sometimes molded separately to avoid a molding process in which a thin pin is used to form the opening. A tube 136 downstream of insert 130 is straight because a pin is pulled to form tube 136. This is not the preferred shape, simply what is available based on the manufacturing process. Disadvantages in the prior art include: the requirement of molding a separate piece for the insert and a plug; obtaining an ejector with less than desired flow characteristics (due to having straight section downstream of the throat); and the resulting ejector is bulkier than desired.

An ejector that is compact and easy to manufacture while maintaining tight tolerances, particularly in the throat area, is desired.

SUMMARY

To overcome at least one problem in the prior art, an ejector for a canister purge system of a boosted engine is disclosed that has a flange, a venturi tube coupled to the flange, and first and second tubes extending through the flange. The first tube fluidly couples to one end of the venturi tube. The second tube fluidly couples to a downstream end of a throat of the venturi tube. The ejector comprises first and second pieces coupled together. The first piece comprises the first and second tubes, the flange, and an upper half of the venturi tube. The second piece comprises a lower half of the venturi tube.

The flange is substantially planar and a centerline of the venturi tube is substantially parallel to the flange.

The second tube is substantially perpendicular to the flange and a centerline of the first tube and a centerline of the second tube form an acute angle. Or in other embodiments, a centerline of the first tube and a centerline of the second tube are substantially parallel; and the centerline of the first tube is substantially perpendicular to the flange.

The first piece and the second piece are coupled sonic welding, vibration welding, induction welding, laser welding, ultrasonic welding, hot plate, and infrared welding, or thermal welding. In other embodiments, the first and second pieces are coupled by a plurality of snap fit connectors arranged around the periphery of the first and second pieces. A seal between the first and second pieces is provided by one of: an adhesive material provided on the interface surfaces of the first and second pieces and a groove in at least one of the interface surfaces with an O-ring disposed in the groove. In some embodiments, the seal is unnecessary.

The venturi tube comprises a converging section to which the first tube is fluidly coupled, the throat, and a diverging section. In some embodiments, the throat diverges.

In some embodiments, a centerline of the diverging section angles downward slightly with respect to the flange. In some embodiments, the diverging section has a circular cross section at the throat and a cross section of a flattened circle at the exit with the portion of the circle that is flattened is proximate the flange.

Also disclosed is an ejector system with an ejector that includes a venturi tube having a converging section, a throat, and a diverging section; a first tube fluidly coupled to the converging section; and a second tube fluidly coupled to the throat. The venturi tube has first and second pieces welded together.

An interface between the first and second pieces of the ejector is substantially coincident with a diameter of the venturi tube.

The first piece of the ejector includes the first and second tubes and a flange through which the first and second tubes pass.

The ejector system further has an intake system component defining an opening and having a flat surface at the periphery of the opening. A periphery of the flange also has a flat surface. The flat surface of the flange is welded or otherwise attached or integrated to the flat surface of the opening associated with the intake system component.

The intake system component is an air cleaner box or an air duct.

Flash traps are provided adjacent to the surface of the opening associated with the intake system component. Such flash traps largely prevent flowing material from getting into places that would interfere with the performance of the ejector.

At least one flash trap is provided in the flange of the ejector immediately adjacent to the surface of the flange that is welded to the intake system component.

The first tube is also fluidly coupled to an air intake and the second tube is also fluidly coupled to a volume associated with a fuel tank.

An ejector system for a boosted engine includes: an air duct and an ejector coupled to the air duct. The ejector has: a first piece having a first tube, a second tube, a flange with a flat surface around the periphery, and a first portion of a venturi tube; and a second piece that is coupled to the first piece and comprises a second portion of the venturi tube. The first and second pieces are affixed by welding, snap fitting, and mechanical fasteners.

The air duct defines an opening with a flat surface surrounding the opening. The flange of the ejector has a flat surface that interfaces with the flat surface of the air duct. The flat surface of the ejector is welded to the flat surface of the air duct with the venturi tube of the ejector located inside the air duct.

The venturi tube of the ejector includes a converging section, a throat, and a diverging section. A centerline of the converging section and a centerlines of the throat are substantially parallel to the flange. A centerline of the diverging section dips downward from plane of the flange as considered in the direction of flow.

In one embodiment, an ejector for a canister purge system of a boosted engine, includes: a flange; a venturi tube coupled to the flange, the venturi tube comprising a converging section, a throat, and a diverging section (alternatively called a diffuser); a first tube fluidly coupled to the venturi tube upstream of the converging section; a second tube fluidly coupled immediately downstream of the throat; and an intake system component defining an opening and having a surface at the periphery of the opening. A periphery of the flange has a surface that is affixed to the surface of the opening associated with the intake system component.

In some embodiments in which the first and second pieces of the ejector are welded, one of the two pieces of the ejector has a skirt extending from a periphery of the ejector. The skirt forms a butt weld and the mating surfaces form a butt weld. The skirt serves as a pilot to locate the two pieces before welding.

The ejector is formed by one of: injection molding, 3-D printing, casting, vacuum forming, blow molding, rotomolding, resin transfer molding, and machining from a blank.

In some embodiments, a centerline of the diverging section is offset from a centerline of the converging section of the venturi tube. The offset can be in vertically upward or downward direction.

The ejector is affixed to the intake air component by one of: a weld, screws, mechanical fasteners, rivets, and an adhesive.

In some embodiments, the ejector is a single piece, such as with 3-D printing. In other embodiments, the majority of the ejector is made in a single piece with a plug in one end. The plug could be threaded or affixed in any suitable manner. Such embodiments are suitable for traditional casting processes or machining from a blank, as non-limiting examples.

In some ejectors one of the tube is canted with respect to the flange in in some embodiments both tubes are canted with respect to the flange, i.e., a centerline of the tube forms an acute angle with the flange.

To prevent recirculation at some operating conditions, it has been found helpful to provide a divot that extends into the flow path of the diverging section of the ejector. In some embodiments, the divot is like an extended tear drop and in other embodiments, it is squared off. Other shapes are also within the scope of the disclosure.

By placing the venturi tube within the air system component, the ejector system is more protected from potential breakage by carelessness or in a crash than when the ejector is primarily external.

Having the venturi tube substantially parallel to the flange of the ejector means the ejector extends into the air system component to which it is affixed to a much lesser extent than if the venturi tube is perpendicular to the flange, such as in the prior art shown in FIGS. 2 and 3.

Advantages of the disclosed embodiments include: simplified construction, improved quality, fewer parts, lower piece cost, lower tooling investment, fewer assembly steps, lower weight, and more reliable and repeatable manufacturing and assembly.

In applications where packaging is tight, the embodiment in which one of the tubes is canted with respected to the other tube shortens the ejector length. If further shortening is desired, the flange is shortened in the vicinity of the exit of the diverging section. Both shortening embodiments can be combined to provide a very compact injector.

In the prior art method of making an ejector, as will be discussed in more detail below, a pin is used to form the throat. In some applications, the pin to form the throat of the venturi is so thin and long that it is very likely to break causing manufacturing downtime. The ejector disclosed herein eliminates such need for a pin at all.

Another issue that occurs due to the pin is molding flash, i.e., excess material that moves into a spot wherein it is not intended to be. For the converging and diverging sections of the venturi, the diameter is fairly large and a bit of flashing doesn't cause substantial blockage. It may disrupt the flow a bit and cause some flow losses. However, flashing in the throat area is particularly troublesome and will cause variation in performance, at least, and will likely fail. Furthermore, it could become a source of contamination. It is a quality problem and a scrap problem.

The ejector according to embodiments disclosed herein provide a substantial performance advantage of about 25% greater flow over the boost range compared to prior art ejectors. The reason for the advantage in flow is due to the two-piece sectioning of the ejector through the venturi affording the ability to optimize the geometry in the venturi. The advantage also applies to one-piece ejectors in which the geometry is similarly controlled in a manner superior to prior art ejectors.

BRIEF DESCRIPTION OF THE DRAWINGS

FIG. 13 is a flowchart illustrating a process, according to the present disclosure, by which an ejector can be fabricated;

FIGS. 14 and 15 are flowcharts showing alternative processes to those shown in FIG. 13;

FIG. 16 is a flowchart showing processes involved in installing the ejector into an engine air component;

FIG. 21 is a one-piece embodiment of the ejector that provides tight tolerance for the diverging section, the converging section, and the throat;

FIG. 22 is a two-piece embodiment of the ejector in which the centerline of the converging section is offset from the centerline of the diverging section;

FIG. 24 is an isometric view of an ejector having a divot proximate the exit of the diverging section;

FIGS. 25 and 26 are two views of the diverging section of the ejector of FIG. 24; and FIG. 27 is an isometric view of an ejector having a squared off divot proximate the exit of the diverging section.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 5:
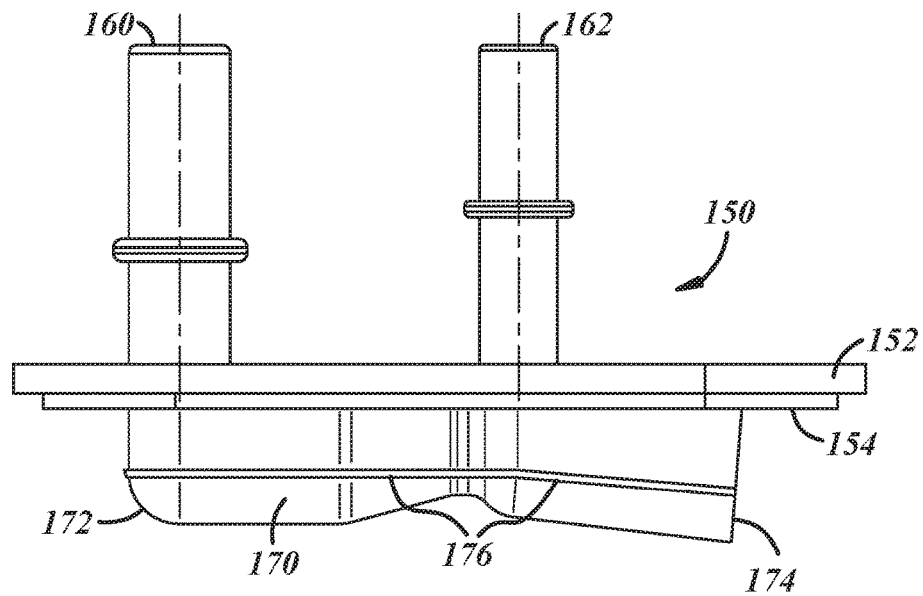
FIG. 5 is an ejector according to an embodiment of the disclosure.
Figure 6:
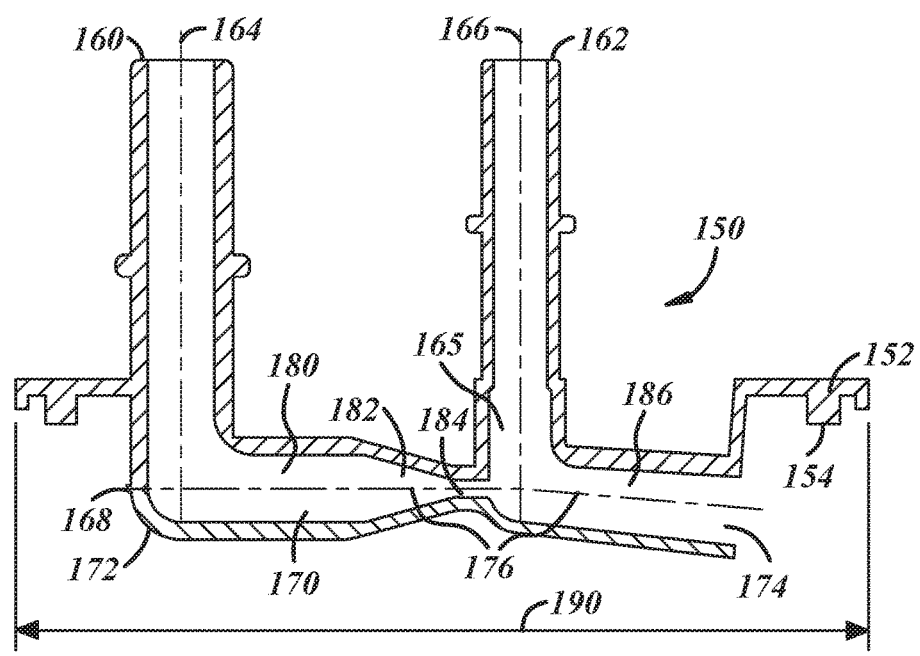
FIG. 6 is the ejector of FIG. 5 shown in cross section.

One embodiment of an ejector 150 according to the disclosure is shown in FIGS. 5 and 6. Ejector 150 has a flange 152 with a surface 154. Surface 154 allows coupling with the periphery of an opening in an intake component. Flange 152 has a first tube 160 having a centerline 164 and a second tube 162 having a centerline 166 extending there through. First tube 160 is coupled to an air inlet (not shown) to bring in fresh air. Second tube 162 is coupled to a carbon canister (also not shown) to purge the carbon canister. A venturi tube 170 is at the bottom of ejector 150. A first end 172 of venturi tube 170 is closed and a second end 174 is open. The fresh air through first tube 160 and the fuel vapor laden gases of second tube 162 that are mixed in venturi tube 170 exits through second end 174. Ejector 150 is made up of two pieces that are welded together at an interfaces of the two parts to form weld joint 176. Weld joint 176 is slightly angled in ejector 150. In other embodiments, weld joint is planar. The first piece includes the elements above weld joint 176, i.e., first tube 160, second tube 162, flange 152 and an upper portion of venturi tube 170. The second piece includes a lower portion of venturi tube 170.

Weld joint 176 is substantially parallel to flange 152 and is coincident with a diameter of an opening through venturi tube 170. Referring now to FIG. 6, which is a cross-sectional view of FIG. 5, an internal shape of venturi tube is shown. An entrance section 180 receives fresh air from tube 160. The purpose of entrance section 180 is to straighten the flow after traveling through the 90-degree bend between tube 160 and entrance section 180. A converging section 182 is downstream of entrance section 180. Flow is accelerated in converging section 182. Flow from converging 182 is introduced into a throat 184. Throat 184 includes the smallest cross-sectional portion of venturi tube 170. The embodiment of throat 184 shown in FIG. 6 slightly diverges. The downstream end of second tube 162 couples to venturi tube 170 immediately downstream throat 184. As is well known by one skilled in the art, the acceleration of flow in the throat area leads to a drop in pressure, which draws the flow through tube 162. Downstream of throat 184 is diverging section 186. In the embodiment in FIG. 6, a centerline of diverging section 184 dips downward as considered from left to right. This improves flow characteristics. In other embodiments, the centerline of the venturi tube is straight. In some embodiments, such as shown in FIG. 6, tube 162 expands near a downstream end, such as the portion 165 of tube 162 shows. In some embodiments, the weld between the two pieces of ejector 150 in FIG. 6 is a combination of a butt weld at the interface between the two surfaces and a shear weld. The shear weld comes about by providing a skirt 168 on the lower piece of ejector 150 that extends toward the upper piece. In an alternative embodiment, the skirt can be provided on the upper piece of ejector 150.

Figure 7:
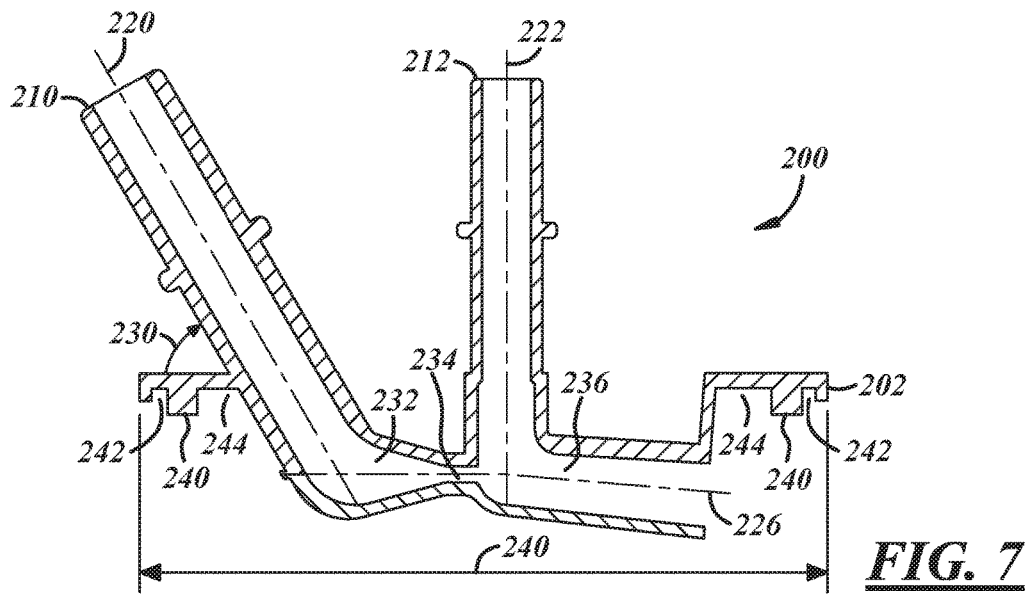
FIG. 7 is an ejector according to an embodiment of the disclosure shown in cross section.

Referring to FIG. 7, an alternative embodiment of an ejector 200 is shown that includes a flange 202 and first and second tubes 210 and 212, respectively, which extend through flange 202. First tube 210 is canted with respect to second tube 212. A centerline 220 of first tube 210 forms an acute angle 230 with respect to flange 202. An advantage of such a configuration is that tube 210 doubles as an entrance section of the venturi tube. A converging section 232 couples directly with first tube 210. A throat 234 is downstream of converging section 232. A diverging section 226 is downstream of throat 234. Ejector 200 is made up of two separately formed pieces that are affixed at a weld joint 226. Alternatively, these can be snap fit, twist locked, mechanically fastened, or coupled with an adhesive.

One of the advantage of ejector 200 of FIG. 7 is that the length of ejector 200 is shown as 240 compared to length 190 of ejector 150 of FIG. 6 is shorter. Such a configuration requires a smaller opening in an air intake component to accommodate it. In an application where the intake duct has many curves and bends, there may be only a short section that is straight enough to accommodate the ejector. Thus, a short ejector is particularly useful in certain applications.

As will be discussed below, ejector 200 is coupled to an air intake component. In some embodiments, a surface 240 on the underside of flange 202 interfaces or mates with a surface on the intake air component. As discussed, some of the material is displaced into a place where it is not wanted during the molding process, molding flash. When ejector 200 is welded to the air intake component, welding flash develops. To present welding flash from going into places that would interfere with the function of the ejector, flash traps 242 and 244 are provided on either side of ejector 200.

Figure 8:
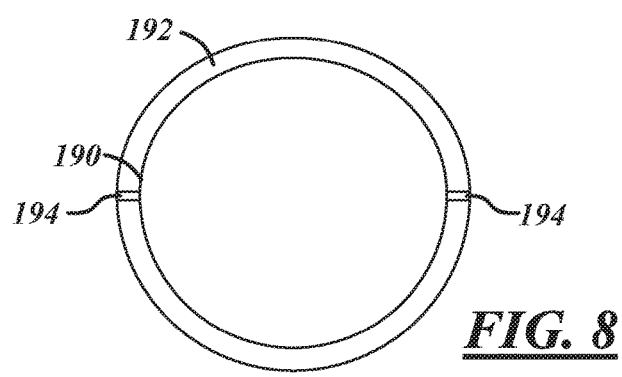
FIG. 8 is a cross section of an exit section of a venturi tube according to an embodiment of the disclosure.

Analysis of the design has indicated that it is preferable for exit cross section of the ejector (150, 200, as examples) to be a flattened circle. An exit 190 of an ejector is shown in FIG. 8. The upper portion 192 of exit 190 is flattened. Exit 190 is made up of two pieces that are welded together at interfaces 194.

Figure 9:
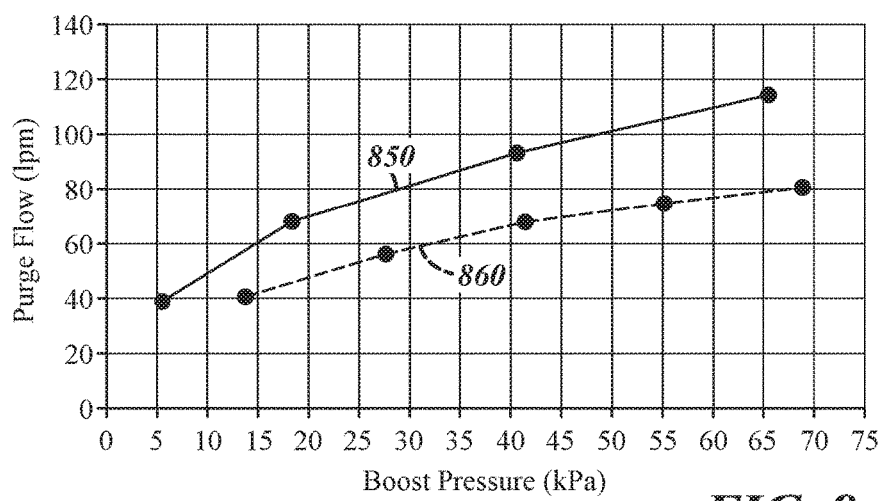
FIG. 9 is a graph of flowrate as a function of boost pressure comparing a prior art ejector and a presently disclosed ejector.

Flowrate 850 of a prior art ejector and flowrate 860 of the ejector of FIGS. 7 and 8 have been compared and are shown in FIG. 9. The ejector, according to the present disclosure, has significantly improved flowrate at all boost pressures. The improved flowrate is due to the venturi tube having a distinct converging and diverging sections rather than straight tubes found in the prior art.

Figure 10:
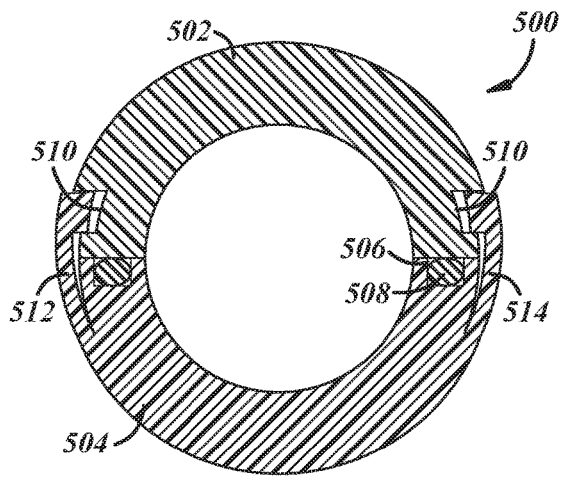
FIGS. 10 and 11 are cross sections of a portion of ejectors having snap fit connections.

In an alternative embodiment in FIG. 10, an alternative method of affixing the upper piece 502 and lower piece 504 of a cross section of a portion of an ejector 500 is shown. Lower piece 504 is provided with a groove 506 in a face of lower piece 504 that interfaces with lower piece 502. An O-ring 508 is placed into groove 506. Upper piece 502 is provided with a recess 510 along an outer surface. Recess 510 does not extend all the way to the interface with lower piece 502. A lip 514 extends outwardly. Lower piece 512 is molded with a flexible finger 510 that engages with lip 514.

Figure 1:
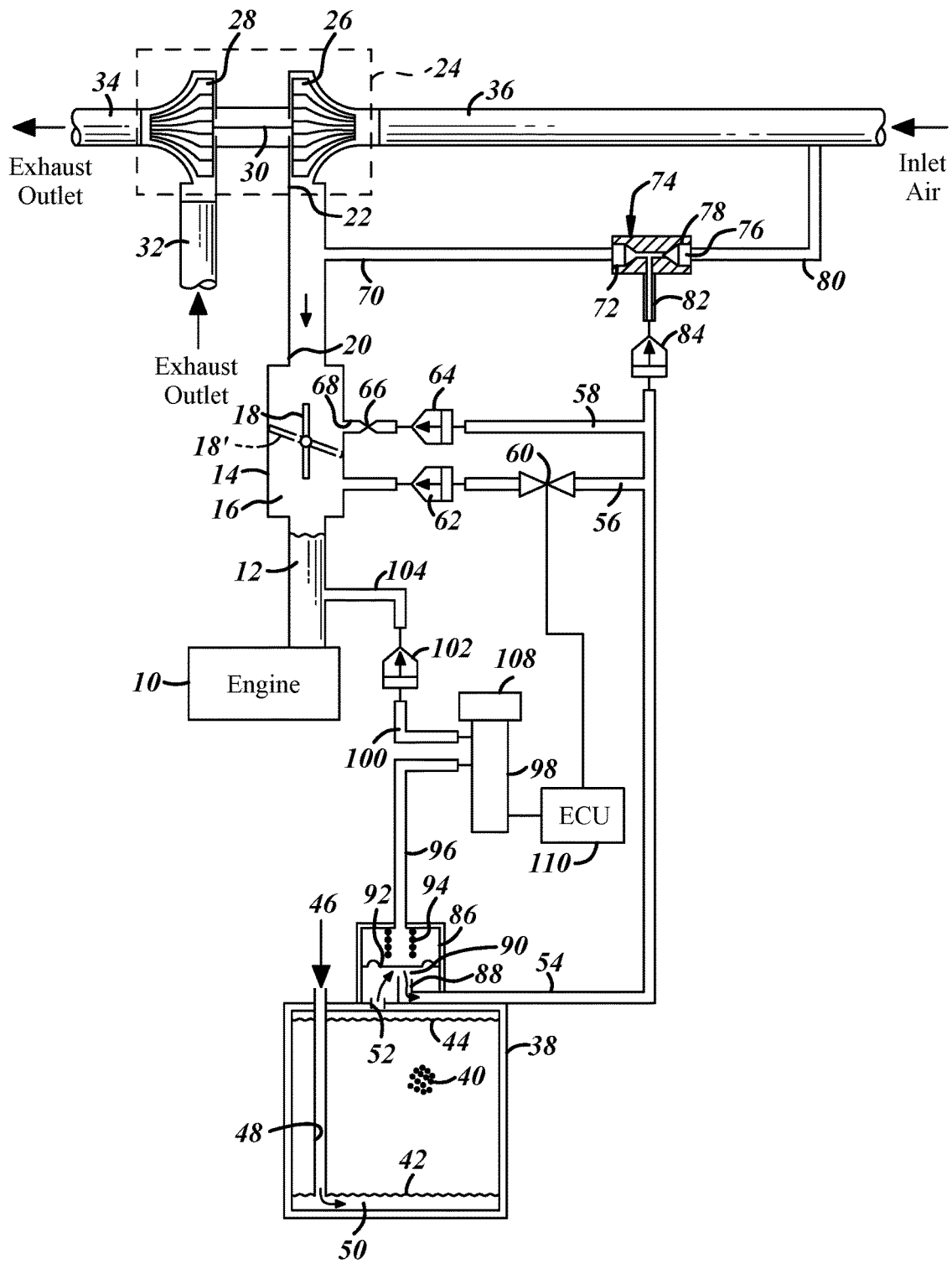
FIG. 1 is an illustration of a canister purge system which includes an ejector according to the prior art.
Figure 2:
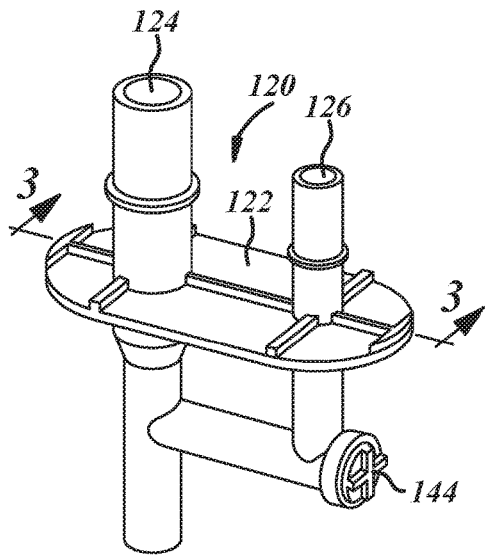
FIG. 2 is a prior art ejector.
Figure 3:
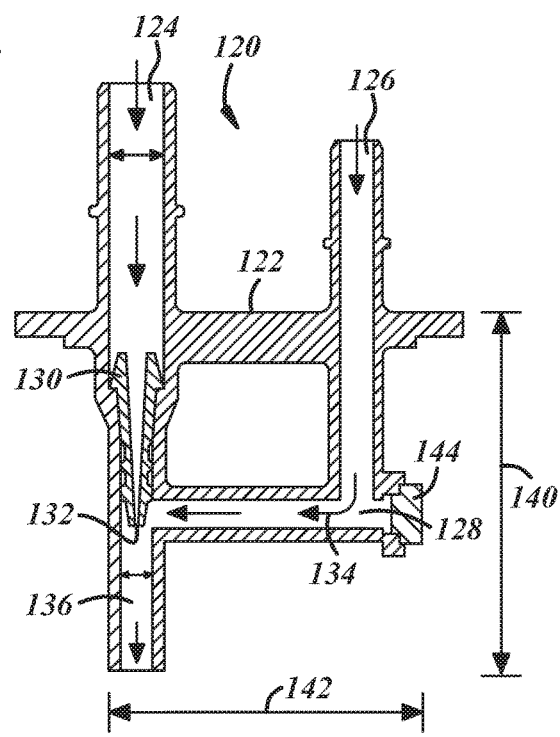
FIG. 3 is the ejector of FIG. 2 in cross section.
Figure 11:
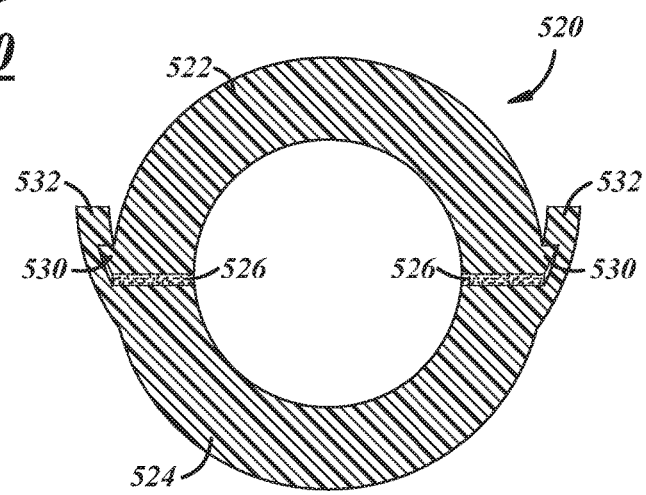
Figure 12:
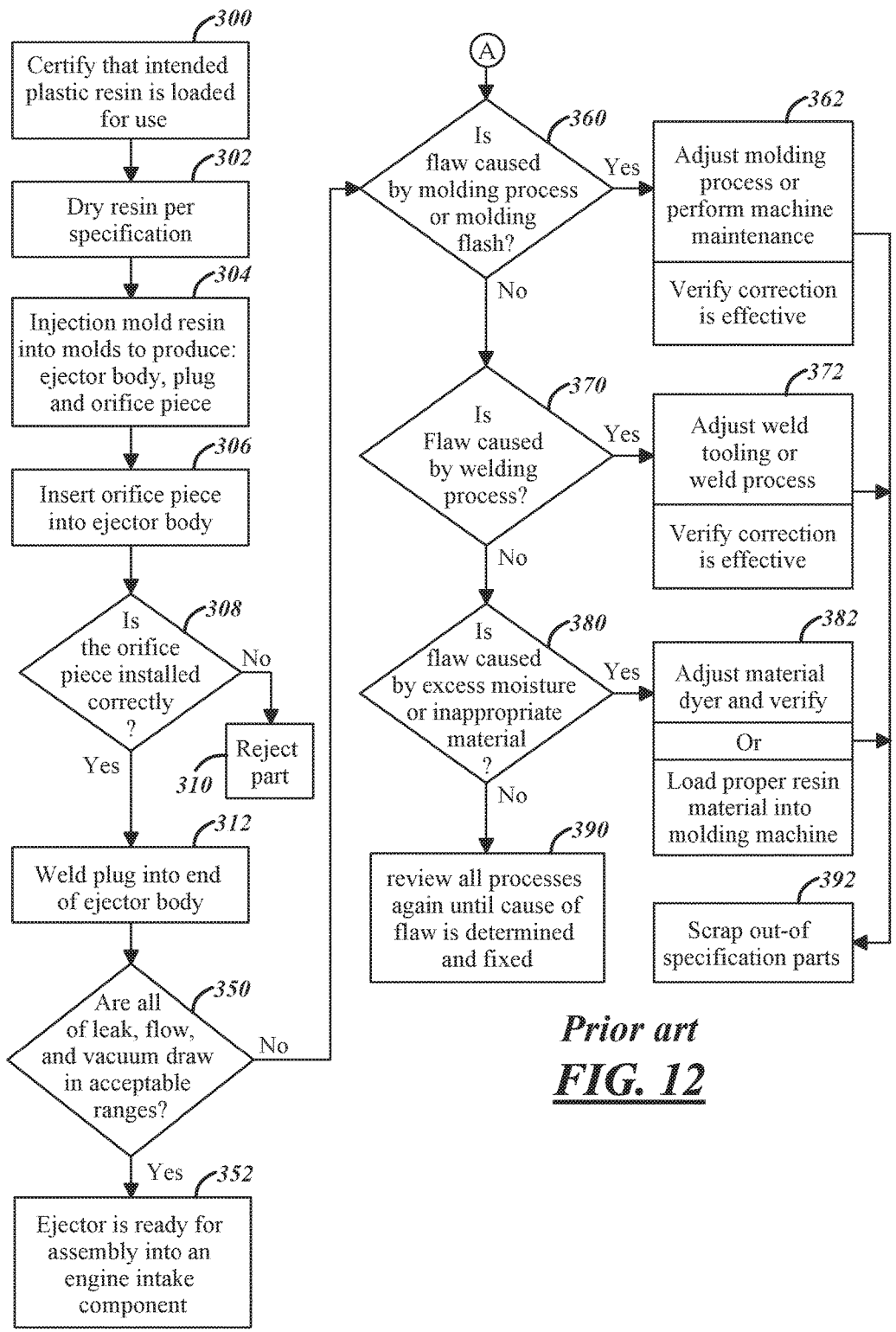
FIG. 12 is a flowchart illustrating a prior art process by which an ejector can be fabricated.

In another embodiment in FIG. 11, a cross section of a portion of an ejector 520 has an upper piece 522 and a lower piece 524. Upper piece 520 has a wedge 530 that extends outwardly from the surface. Lower piece 524 has a flexible finger 532 that engages with wedge 530. In the embodiment in FIG. 11, an adhesive 526 has been applied to the interface surface of upper part 522 and/or the interface surface of lower part 524. In the discussion of FIGS. 10 and 11, the flexible finger is on the lower part. However, this is simply a non-limiting example. Variations of these examples are also within the scope of the disclosure The improved design of the ejector disclosed herein is at least partially due to a new method of manufacturing such ejectors. A prior art process is shown in FIG. 12. In blocks 300 and 302, the resin to provide to the injector molder is of the appropriate specification and that is properly dried, respectively. In block 304, the resin is injected into the three molds to produce: an ejector body, a plug, and an orifice piece that includes at least the throat of the venturi. The orifice part is molded separately because the orifice size at the throat is small. It is possible to integrate the orifice piece into the ejector body. However, a thin pin is required to form the throat. A rule of thumb is that the length of the pin should be no more than 3.5 times the diameter of the pin. Such a pin for an integrated throat would exceed this safe number by at least an order of magnitude. Such a thin pin that much extend into the ejector body at such a distance is likely to lead to failures of the pin. This causes breakage, downtime, increases scrap, and generally increases the cost of the manufacturing process. The more robust method to manufacture, according to the prior art, is to make the orifice piece separately. In block 306, the orifice part is inserted into the ejector body. Each of the ejector bodies is inspected in block 308. If improperly installed, the part is rejected in block 310. If proper installation, the plug is affixed to the ejector body in block 312. In the prior art ejector such as shown in FIGS. 2 and 3, almost the entire ejector is formed in one piece. To form tube 134 of FIG. 3, an opening at one end is provided that is closed off by plug 144.

Quality assurance measures begin in block 350 in which all of leak, flow and vacuum draw are measured and it is determined whether they are in acceptable ranges. If so, the ejector is ready for assembly into an engine intake component, in block 352. If out of specification in block 350, it is determined whether the flaw was caused by the molding process or molding flash (excess material on the part) in block 360. If that is determined to be the issue, in block 362, the molding process is adjusted or machine maintenance is performed and it is verified that the correction is effective before resuming. If a negative result from block 360, in block 370, it is determined whether the flaw was caused by the welding process. If so, the weld tooling or process is adjusted in block 372. Also, in block 372, it is determined whether the correction is effective. If a negative result in block 370, in block 380, it is determined whether the flaw is caused by excess moisture and/or whether the resin material is out of specification. If the dryness is causing the flaw, the material drying process is adjusted and verified. If the material is out of specification, the proper material is obtained and loaded into the molding machine, in block 382. In any case with an out of specification part, the part is scrapped in block 392. If a negative result in block 390, additional review of the processes is continued until cause of the flaw is determined and rectified.

A flow chart showing processes undertaken to produce the disclosed ejector is shown in FIG. 13. Blocks 300, 302, 350, 352, etc. are mostly the same for the disclosed process and the prior art process. Thus, they are not separately described here. Starting in block 320, the upper and lower pieces of the ejector are injection molded. In block 322, the two pieces are affixed. In one embodiment, the pieces are affixed by welding: sonic, ultrasonic, thermal, or any suitable type of welding. An alternative embodiment is shown in FIG. 14 in which an O-ring is placed in a groove in an interface of the first or second pieces in block 324. One of the first and second pieces has a flexible finger that engages with a feature on the other piece in block 326. When the pieces are snapped together, the O-ring is pressed into the groove and seals the first piece with the second piece. In another alternative in FIG. 15, the interfaces between the first and second piece is flat. At least one of the interfaces has adhesive applied, block 328, so that when the first and second pieces are snapped together in block 330, the adhesive seals the interface between the first and second pieces.

In FIG. 16, an ejector is manufactured in block 400, such as by the process in FIGS. 13-16. In block 402, the air intake component is manufactured with an opening to accommodate the ejector. In some embodiments, the flange of the ejector is as short as possible so that the opening in the intake air component is as small as possible. This is particularly useful when the desired location is in an engine duct with lots of turns, i.e., a limited straight run to accommodate the ejector. In such cases with short flanges, the exit portion of the ejector is tilted downward to access the opening in block 410. In some other embodiments, the ejector can be put into the orifice directly without tilting. In block 412, the interface of the flange of the ejector is aligned with the interface of the air intake component, i.e., a raised portion around the opening in the air intake component that is provided for this purpose. The ejector is welded onto the intake air component, in block 414.

Figure 17:
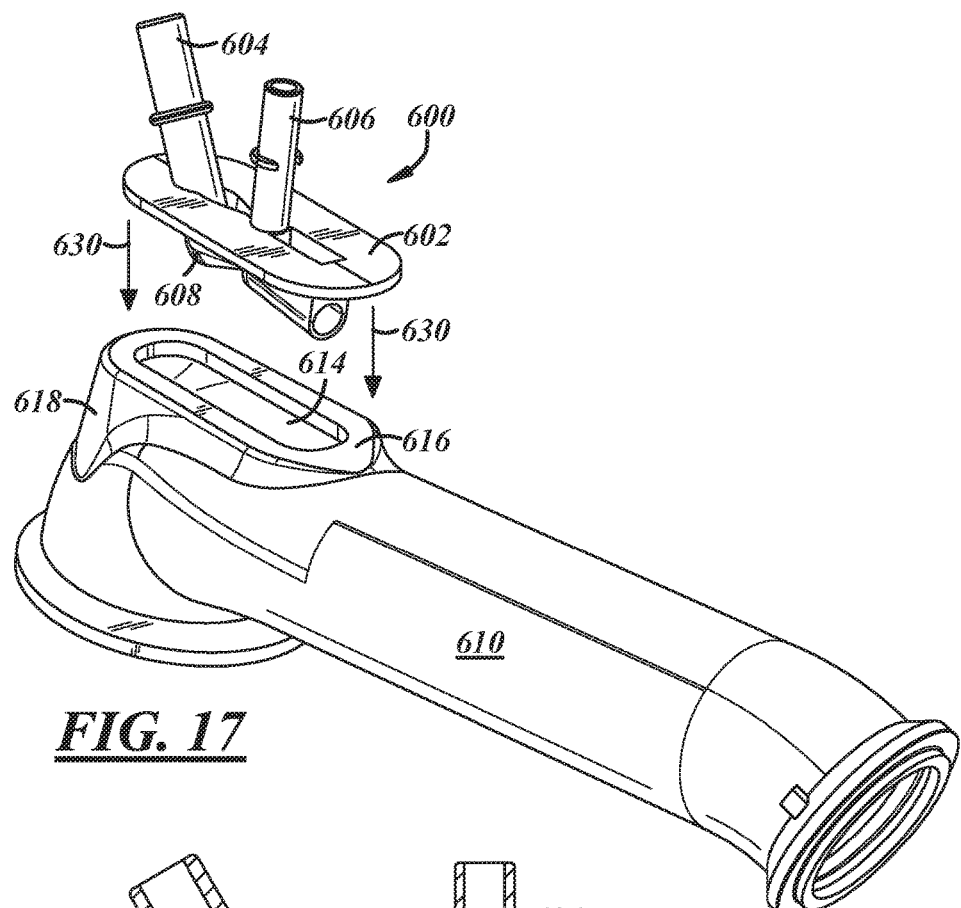
FIG. 17 is an illustration showing an air duct and an ejector prior to assembly.
Figure 18:
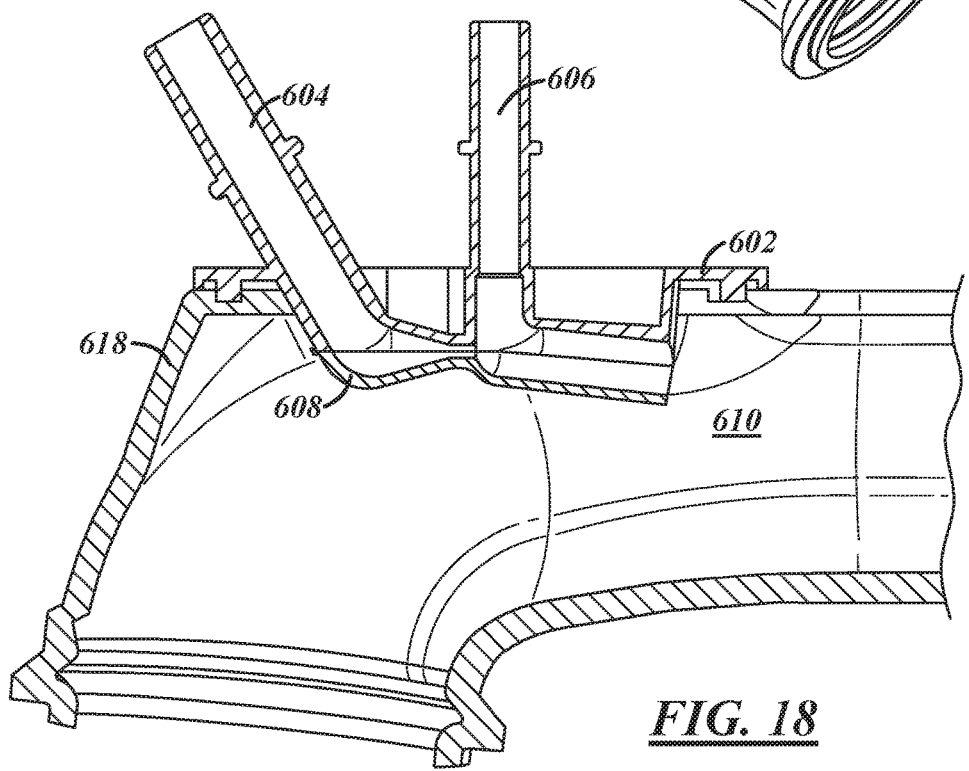
FIG. 18 is a cross section of the air duct and the ejector after assembly.

In FIG. 17, an ejector 600 is shown above an air duct 610 prior to assembly. Ejector 600 has a flange 602, first and second tubes 604 and 606, and a venturi tube 608. Air duct 610 has a protuberance 618 that accommodates forming a flat surface 616 onto which a flange 602 mounts. Surface 616 surrounds an opening 614 into which venturi tube 608 be placed. Opening 614 is large enough to allow venturi tube 608 to go into opening 614 straight on, as shown by arrows 630. Ejector 600 is affixed to air duct 610 by friction welding or any other suitable process. A cross section of an ejector-air duct assembly is shown in FIG. 18. The underside of flange 602 is affixed to the periphery of the opening, surface 616 of FIG. 17.

Figure 19:
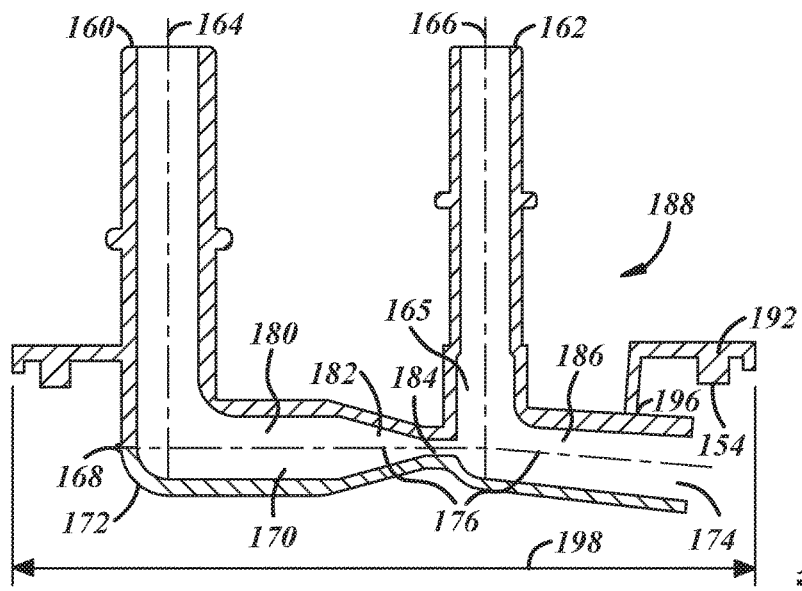
FIG. 19 is a cross-sectional view of a shortened ejector.

The duct shown in FIGS. 17 and 18 has a straight section that is long enough to accommodate an opening 614 (shown in FIG. 17) for ejector 610. However, in some applications, air ducts have limited ability to accommodate ejector 610, or even the shorter ejector shown in FIG. 7. A shorter version of ejector 150 of FIG. 6 is shown in FIG. 19. Ejector 188 is nearly identical to ejector 150, of FIG. 6, except that flange 192 couples to diverging section 174 at location 196, which is closer to tube 162 than in FIG. 6. The length of ejector 188 is shown having a length 198 in FIG. 19, which is shorter than ejector 150 of FIG. 6 that has a length 190.

Figure 20:
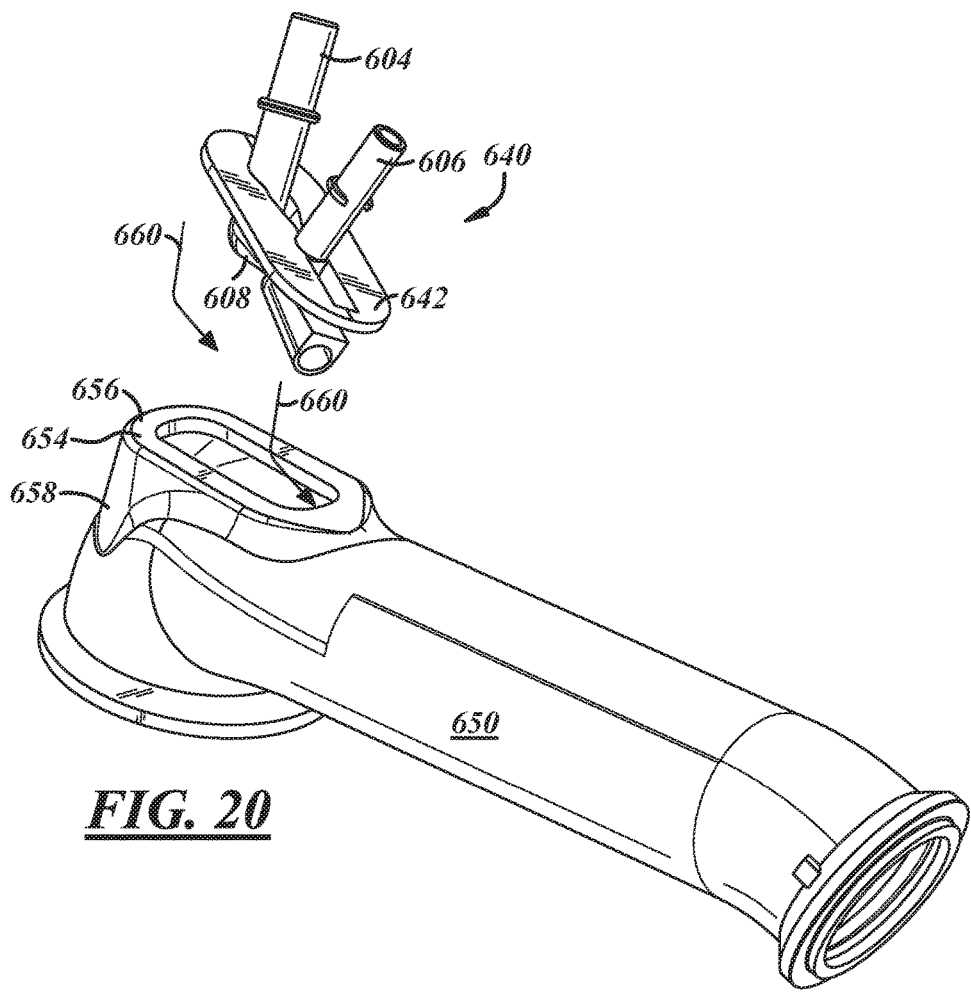
FIG. 20 is an illustration showing an air duct with the shortened ejector of FIG. 19 prior to assembly.

In FIG. 20, a shortened ejector 640 is shown that has a shortened flange 642 (similar to the shortened flange in FIG. 19) with tubes 604 and 606 extending from flange 642. Air duct 650 has a protuberance 658 that has an opening 654 (also shortened) that has a surrounding surface 656 to which flange 642 is affixed. Because venturi tube 608 sticks out beyond flange 642 compared to venturi tube 608 in relation to flange 602 of FIG. 17, venturi tube 608 cannot be installed into opening 654 directly but must be tipped, as shown in FIG. 20. After venturi tube 608 enters opening 654, ejector 640 can be straightened out so that flange 642 meets with surface 656. This tilting and then straightening is illustrated by arrow 660.

Figure 4:
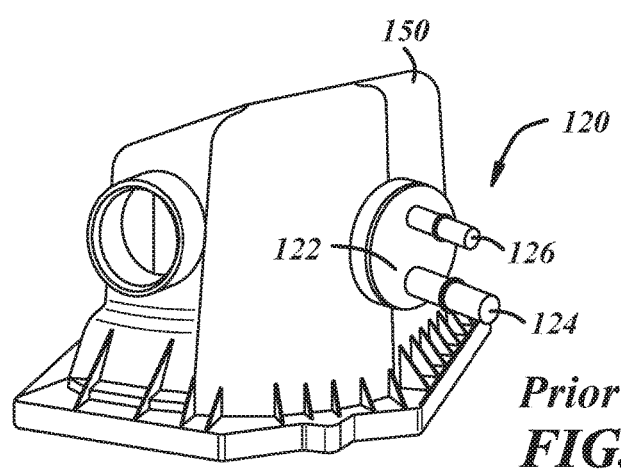
FIG. 4 is the ejector of FIG. 2 shown installed in an air box.

It is known to manufacture the ejectors by injection molding. In the prior art, such manufacturing technique leads to the difficulty in making diverging and converging sections in the ejector because such sections are formed by cylindrical pins. According to embodiments disclosed above, the two-piece version that is split along venturi tube allows a complicated shape can be formed with a converging section, a diverging section, and a throat, that in some embodiments, slightly diverges. In the prior art, throats are typical straight. However, in some applications, it has been found that the diverging throat yields improved flow efficiency approaching supersonic flow. In some embodiments, the diverging section has a non-uniform shape and in some embodiments, tilts downwardly; such features are easily accomplished with the two-piece ejector disclosed herein. Although it might be less expensive to injection mold the ejector out of two pieces, there are alternative manufacturing techniques that allow the desired shape in one piece. A 3-D printing process is one alternative. The resulting could be like any of FIGS. 5-7, except that the ejector would be of one piece. The difference between a 3-D printed ejector according to an embodiment of the present disclosure compared to the prior art in FIGS. 2-4 is that the ejector in FIGS. 2-4 have straight tube, whereas a 3-D printed ejector can have a converging section, a throat of controlled diameter, and a diverging section. In yet another embodiment shown in FIG. 21, an ejector, according an embodiment of the disclosure, is formed in one piece via a traditional casting method. To remove the core pieces, i.e., that provide the openings within the venturi tube, a plug is provided proximate the upstream end of the venturi tube. Finally, although very costly, the ejector can be machined from a blank.

In FIG. 22, an ejector 710 has a throat 715 with a converging section to the left (upstream) and a diverging section to the right (downstream). A centerline 712 of the converging section is offset from a centerline 714 of the diverging section. A left tube 716 of ejector 710 is canted. A right tube 718 is also canted in ejector 710. It has been found through modeling that such an offset provides greater flow, particularly when both tube 716 and 718 are canted as shown in FIG. 22.

As described above, some embodiments show a snap fit to affix the two pieces of the ejector. In such embodiments, an O-ring, adhesive, or other sealant can be used. Alternatively, a bump near the periphery of one of the pieces causes an interference with the other piece of the ejector.

Figure 23:
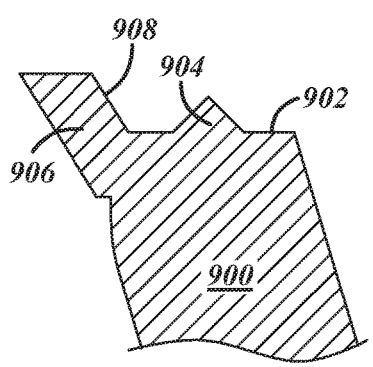
FIG. 23 is an expanded, cross-sectional view of a portion of the two pieces of ejector, showing an energy director and a skirt.

In FIG. 23, a detail of a lower portion 900 of the ejector is shown. A surface 902 has an energy director 904 that is useful in the welding process. Energy director 904 is typically sits proud of the surface by about 0.6 mm. Surface 902 forms a butt weld with respect to a mating surface (not shown). A skirt 908 has two functions: serves as a pilot to locate the mating surface during assembly. Furthermore, the surface 908 forms a shear weld with a portion of the mating part.

An isometric view of an ejector has a diverging section 1000 in which a divot 1002 is formed is shown in FIG. 24. FIG. 25 is a top view of diverging section 1000 with divot 1002 and FIG. 26 is a side view. FIG. 27 shows an isometric view of an ejector 1100 in which a diverging section 1002 is provided with a squared-off divot 1106 that has a short wall 1104. Divots 1002 and 1106 are provided to prevent recirculation, which would diminish flow through the ejector, that occurs at some operating conditions.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, efficiency, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A compact ejector for a canister purge system of a boosted engine, comprising:
   a flange;
   a venturi tube coupled to the flange; and
   first and second tubes extending through the flange wherein:
     the first tube fluidly couples to one end of the venturi tube;
     the second tube fluidly couples to a downstream end of a throat of the venturi tube;
     the ejector comprises first and second pieces coupled together;
     the venturi tube comprises first and second pieces coupled together;
     the first piece comprises the first and second tubes, the flange, and an upper portion of the venturi tube; and
     the second piece comprises a lower portion the venturi tube.

2. The ejector of claim 1 wherein the flange is substantially planar and a centerline of the venturi tube is substantially parallel to the flange.

3. The ejector of claim 1 wherein:
   the second tube is substantially perpendicular to the flange; and
   a centerline of the first tube and a centerline of the second tube form an acute angle.

4. The ejector of claim 1 wherein:
a centerline of the first tube and a centerline of the second tube are substantially parallel; and
the centerline of the first tube is substantially perpendicular to the flange.

5. The ejector of claim 1 wherein the first piece and the second piece are coupled by one of sonic welding, ultrasonic welding, thermal welding, vibration welding, induction welding, laser welding, a hot plate, and infrared welding.

6. The ejector of claim 1 wherein:
the first and second pieces are coupled by a plurality of snap fit connectors arranged around the periphery of the first and second pieces.

7. The ejector of claim 1 wherein:
the venturi tube comprises a converging section to which the first tube is fluidly coupled, the throat, and a diverging section.

8. The ejector of claim 7 wherein at least one of the following characteristics of the diverging section exists:
a centerline of the diverging section angles downward slightly with respect to the flange; and
the diverging section has a circular cross section proximate the throat and across section of a flattened circle proximate an exit of the diverging section.

9. An ejector system for a boosted engine, comprising:
an air system component;
an ejector coupled to the air system component, the ejector comprising:
a first piece having a first tube, a second tube, a flange with a surface around the periphery, and a first portion of a venturi tube; and
a second piece that is coupled to the first piece and comprises a second portion of the venturi tube.

10. The ejector system of claim 9 wherein the first and second pieces are affixed by one of welding, snap fitting, and mechanical fasteners.

11. The ejector system of claim 9 wherein:
the air system component defines an opening with a surface surrounding the opening;
the flange of the ejector has a surface that interfaces with the surface of the air system component; and
the surface of the ejector is welded to the surface of the air system component with the venturi tube of the ejector located inside the air duct.

12. The ejector system of claim 9 wherein:
the venturi tube of the ejector comprises a converging section, a throat, and a diverging section;
a centerline of the converging section and a centerline of the throat are substantially parallel to the flange; and
a centerline of the diverging section dips downward from plane of the flange as considered in the direction of flow.

13. The ejector system of claim 9 wherein the air system component is one of an air filter box and an intake air duct.

14. The ejector system of claim 9 wherein when the first piece is coupled to the second piece a seal between the first and second pieces is provided by one of:
an adhesive material provided on the interface surfaces of the first and second pieces; and
a groove in at least one of the interface surfaces with an O-ring disposed in the groove.

15. An ejector system for a canister purge system of a boosted engine, comprising:
a flange;
a venturi tube coupled to the flange, the venturi tube comprising a converging section, a throat, and a diverging section;
a first tube fluidly coupled to the venturi tube upstream of the converging section;
a second tube fluidly coupled to the venturi tube immediately downstream of the throat; and
an intake system component defining an opening and having a surface at the periphery of the opening wherein:
a periphery of the flange has a surface; and
the surface of the flange is affixed to the surface of the opening associated with the intake system component.

16. The ejector of claim 15 wherein:
the ejector is comprised of two pieces that are coupled by one of a weld connection and a snap fit connection;
the first piece comprises the first tube, the second tube, the flange, and a first portion of the venturi tube; and
the second piece comprises a second portion of the venturi tube.

17. The ejector of claim 16 wherein one of the two pieces of the ejector has a skirt extending from a periphery of the ejector to thereby provide a butt and shear weld and a pilot for assembly.

18. The ejector of claim 15 wherein the ejector is made by one of: injection molding, 3-D printing, casting, vacuum forming, blow molding, rotomolding, resin transfer molding, and machining from a blank.

19. The ejector of claim 15 wherein a centerline of the diverging section is offset from a centerline of the converging section of the venturi tube.

20. The ejector of claim 15 wherein:
the intake air component is one of an intake air duct and an air filter box;
the ejector is affixed to the intake air component by at least one of: a weld, screws, mechanical fastener, rivets, and an adhesive.

21. The ejector of claim 15 wherein at least one of:
a centerline of the first tube forms an acute angle with the plane of the flange; and
a centerline of the second tube forms an acute angle with the plane of the flange.

22. The ejector of claim 15 wherein near the outlet end of the diverging section, a divot extends into the flow path of the diverging section.

* * * * *